2,821,539
NOVEL POLYMETHYLENE GLYCOL CARBONATES

Stanley R. Newman, Fishkill, Norman Alpert, Poughkeepsie, and Robert Y. Heisler, Fishkill, N. Y., assignors to The Texas Company, New York, N. Y., a corporation of Delaware No Drawing. Application February 24, 1956
Serial No. 567,476

4 Claims. (Cl. 260—463)

This invention relates to novel glycol derivatives which find a wide variety of uses. More particularly, this invention discloses novel polymethylene glycol carbonates.

The novel compounds of this invention have the following general formula

wherein R is a divalent symmetrical polymethylene radical containing at least 4 carbon atoms, R' is an aliphatic hydrocarbon radical containing 1 to 12 carbon atoms and $n$ has a value of 0 to 10.

The novel compounds of this invention include polymethylene glycol bis(alkyl carbonates) and polymethylene glycol bis(glycol ether carbonates). The polymethylene glycol bis(alkyl carbonates) are represented by the above general formula when $n$ is 0, while the polymethylene glycol bis(glycol ether carbonates) are represented by the above general formula when $n$ has a value of 1 to 10. Hereafter in the description of the invention, the term "polymethylene glycol carbonates" will be used to designate both the polymethylene glycol bis(alkyl carbonates) and the polymethylene glycol bis(glycol ether carbonates).

The novel compounds of this invention are useful as plasticizers for vinyl and other type resins. The polymethylene glycol bis(glycol ether carbonate) group of compounds are particularly useful as fuel and lubricating oil additives as disclosed in our co-pending applications Serial Nos. 567,445 and 567,435 filed of even date. Surprisingly enough, the polymethylene glycol bis(alkyl carbonate) group of compounds are not effective deposit control additives.

The polymethylene glycol carbonate compounds of this invention are readily formed by a series of reactions involving the formation of a chloroformate by reaction of phosgene with a monoalkyl glycol ether or an aliphatic alcohol and subsequently reacting the resulting chloroformate with a polymethylene glycol containing at least 4 carbon atoms in the presence of a hydrogen chloride acceptor such as pyridine or quinoline. An alternate reaction procedure involves formation of a dichloroformate by reaction of polymethylene glycol with phosgene and subsequent reaction of the dichloroformate with an alcohol, a glycol monoether, or a polyglycol monoether in the presence of a hydrogen chloride acceptor. The detailed preparation of the polymethylene glycol carbonates of this invention will be set forth hereafter in connection with the preparation of individual compounds of this class.

The novel polymethylene glycol ether carbonates of this invention are exemplified by the following: Tetramethylene glycol bis(butoxyethyl carbonate), pentamethylene glycol bis(pentoxyethyl carbonate), pentamethylene glycol bis(decoxyethyl carbonate), hexamethylene glycol bis(ethoxyethyl carbonate), hexamethylene glycol bis(octoxyethyl carbonate), hexamethylene glycol bis(butoxyethoxyethyl carbonate), pentmethylene glycol bis(decoxyethyl carbonate), octamethylene glycol bis(ethoxyethyl carbonate), octamethylene glycol bis(butoxyethyl carbonate), decamethylene glycol bis(ethoxyethyl carbonate), decamethylene glycol bis(ethoxyethoxyethyl carbonate), decamethylene glycol bis(butoxyethoxyethyl carbonate), pentamethylene glycol bis(2-butenoxyethyl carbonate), tetramethylene glycol bis(lauroxyethoxyethyl carbonate), tetramethylene glycol bis(ethoxyethoxyethyl carbonate), pentamethylene glycol bis(butoxyethoxyethyl carbonate), pentamethylene glycol bis(octoxyethoxyethyl carbonate), pentamethylene glycol bis(pentoxyethyl carbonate), pentamethylene glycol bis(pentoxyethoxyethyl carbonate), pentamethylene glycol bis(allyl carbonate), pentamethylene glycol bis(n-amyl carbonate), pentamethylene glycol bis(2-ethylhexyl carbonate), pentamethylene glycol bis(lauryl carbonate), tetramethylene glycol bis(n-octyl carbonate), tetramethylene glycol bis(n-decyl carbonate), hexamethylene glycol bis(ethyl carbonate), hexamethylene glycol bis(methyl carbonate) and octamethylene glycol bis(n-hexyl carbonate).

The following examples illustrate the preparation of the compounds of this invention:

EXAMPLE I

*Preparation of 1,5-pentamethylene glycol bis(2-ethoxyethyl carbonate)*

*a.* FORMATION OF 1,5-PENTAMETHYLENE GLYCOL DICHLOROFORMATE 1040 grams (10 moles) of 1,5-pentamethylene glycol was placed in a three-necked reaction flask immersed in an ice-salt bath. After the diol was cooled below 50° F., 4 lbs. 8 oz. (20.7 moles) of phosgene was introduced with stirring to the reaction vessel at a rate so as to maintain the temperature below 50° F. After stirring overnight, the reaction system was flushed with nitrogen for 30 minutes and about 1 liter of water was added. The dichloroformate layer was separated and washed three times with water, dried over Drierite and subsequently filtered to remove the drying agent. The reaction product weighed 1833 grams, a yield of 80% of theory.

*b.* REACTION OF PENTAMETHYLENE GLYCOL DICHLOROFORMATE AND 2-ETHOXYETHANOL 1188 grams (13.2 moles) of 2-ethoxyethanol (Cellosolve) and 1140 grams (14.4 moles) of pyridine were added to a reaction flask which was cooled in an ice-salt bath. When the contents of the flask were below 50° F., 1374 grams of 1,5-pentamethylene glycol dichloroformate prepared above was added at such a rate that the temperature of the reaction mixture was maintained below 50° F. After stirring overnight, about 600 ml. of water was added. The oil layer was separated and washed twice with about two 600 ml. portions of 10% hydrochloric acid until distinctly acid, and finally with saturated sodium chloride solution until the washings were nearly neutral. The washed oil was dried over Drierite, filtered and distilled to give 1126 grams of a colorless liquid boiling at 181 to 185° C. at 2 mm., a yield of 55% of theory. The product was identified as 1,5-pentamethylene glycol bis(2-ethoxyethyl carbonate) by the following quantitative analysis:

|  | Found | Calculated |
|---|---|---|
| C, percent | 53.7 | 53.6 |
| H, percent | 8.46 | 8.34 |

EXAMPLE II

*Preparation of 1,5-Pentamethylene glycol bis(2,2',2''-triethoxyethyl carbonate)*

*a.* PREPARATION OF 2,2',2''-TRIETHOXYETHYL CHLOROFORMATE 2041 grams (11.5 moles) of 2,2',2''-triethoxyethyl alcohol (the monoethyl ether of triethylene glycol) was placed in a three-necked reaction flask equipped with stirring equipment and immersed in an ice-salt bath. After the reactant was cooled below 50° F., 2 lbs. 10 oz. (11.5 moles plus 2 oz. excess) of phosgene was introduced to the reaction vessel at a rate so as to maintain the temperature below 50° F. The resulting reaction mixture was allowed to come up to room temperature by stirring overnight in the ice-salt bath. After 600 ml. of water was added to the reaction mixture to decompose excess phosgene and remove HCl, the reaction was washed four times with a liter of water in each wash until essentially neutral. The reaction product, 2,2',2''-triethoxyethyl chloroformate weighed 1770 grams, a yield 66% of theoretical.

*b.* REACTION OF 2,2',2''-TRIETHOXYETHYL CHLOROFORMATE AND 1,5-PENTAMETHYLENE GLYCOL 348 grams (3.35 moles) of 1,5-pentamethylene glycol and 634 grams (8.03 moles) of pyridine were added to a three-necked reaction flask immersed in an ice-salt bath. After cooling the reaction mixture below 50° F., 1770 grams of 2,2',2''-triethoxyethyl chloroformate was added at such a rate that the temperature of the reaction mixture was maintained below 50° F. After stirring overnight, 500 ml. of water was added, the oil layer separated, and was washed with 500 ml. of 10 percent hydrochloric acid and finally with salt water until the washings were nearly neutral. The washed mixture was dried over Drierite and filtered to give 1480 grams of amber oil. This oil was stripped by heating to a pot temperature of 450° F. at 200 microns, whereby there was obtained a residue of 1013 grams of amber oil, a yield of 59 percent of the theoretical. This product, which had a refractive index of $n_D^{20}$ of 1.4550, was identified as 1,5-pentamethylene glycol bis(2,2',2''-triethoxyethyl carbonate) by the following quantitative analysis:

|  | Found | Calculated |
| --- | --- | --- |
| C, percent | 53.0 | 53.9 |
| H, percent | 8.46 | 8.59 |

EXAMPLE III

*Preparation of 1,5-pentamethylene glycol bis(n-butoxyethyl carbonate)*

*a.* FORMATION OF BUTOXYETHYL CHLOROFORMATE 809 grams (6.8 moles) of butoxyethanol was reacted with 1 lb. 9 oz. of phosgene (6.8 moles plus 1.3 oz. excess) at a temperature below 50° F. After washing with water 5 times and drying overnight with anhydrous calcium sulfate, there was obtained 1148 grams of butoxyethyl chloroformate which represents a 93% yield.

*b.* REACTION OF n-BUTOXYETHYL CHLOROFORMATE AND 1,5-PENTAMETHYLENE GLYCOL

To a mixture of 300 grams (2.89 moles) of 1,5-pentamethylene glycol and 548 grams (6.96 moles) of pyridine immersed in an ice-salt bath, there was added 1148 grams of the butoxyethyl chloroformate. After the reaction mixture was stirred overnight, it was washed with water, 10% hydrochloric acid and saturated salt solution, and dried over anhydrous calcium sulfate. The dried reaction product, weighing 1077 grams, was distilled at 170° C. and at 100 microns to give 904 grams of distillate. The distillate was identified as 1,5-pentamethylene glycol bis(n-butoxyethoxy carbonate) by the following quantitative analysis:

|  | Found | Calculated |
| --- | --- | --- |
| C, percent | 58.7 | 58.2 |
| H, percent | 9.31 | 9.25 |
| Molecular Wt | 385 | 390 |

EXAMPLE IV

*Preparation of 1,5-pentamethylene glycol bis(n-amyl carbonate)*

*a.* PREPARATION OF n-AMYL CHLOROFORMATE 1760 grams (20 moles) of n-amyl alcohol was reacted with 4 lbs. 6 ozs. (20 moles plus 2 oz. excess) of phosgene at a temperature below 50° F. After stirring overnight, the reaction mixture was washed with water 5 times, dried over anhydrous calcium sulfate and filtered to remove the drying agent. The resulting product weighed 2683 grams which represented a yield of 80%.

*b.* REACTION OF n-AMYL CHLOROFORMATE AND PENTAMETHYLENE GLYCOL 2660 grams (17.6 moles) of n-amyl chloroformate was added to a mixture of 832 grams (8 moles) of pentamethylene glycol and 1550 grams of pyridine at such a rate that the reaction temperature was maintained below 50° F. After stirring overnight the resulting product was washed with water, with 10% hydrochloric acid, and then 4 times with saturated salt solution. After drying overnight with anhydrous calcium sulfate, there was obtained 2572 grams of product. On distillation at 152° C. and 100 microns, there was obtained a distillate weighing 2011 grams. The distillate was identified as 1,5-pentamethylene glycol bis(n-amyl carbonate) by the following quantitative analysis:

|  | Found | Calculated |
| --- | --- | --- |
| C, percent | 61.4 | 62.2 |
| H, percent | 9.67 | 9.61 |
| Molecular Wt | 308 | 332 |

EXAMPLE V

*Preparation of 1,5-pentamethylene glycol bis(2-ethylhexyl carbonate)*

1449 grams (6.0 moles) of 1,5-pentamethylene glycol dichloroformate, which was prepared as described in Example I *a*, was added to a mixture of 1655 grams (12.65 moles) of 2-ethylhexanol and 10.68 grams (13.5 moles) of pyridine at such a rate that the reaction temperature was maintained below 50° F. After 500 ml. of benzene was added to aid in stirring, the mixture was stirred overnight. 600 ml. of water added, the separated oil layer washed with 10% hydrochloric acid until the washings were distinctly acidic, and then with saturated salt solution until the washings were neutral. After drying over Drierite, the benzene was removed by distillation at atmospheric pressure and the residue was stripped to a pot temperature of 410° F. at 500 microns. The residue was dissolved in pentane and percolated through 1100 grams of Magnesol. On removing the pentane by distillation, there was obtained 1856 grams of product which was identified as 1,5-pentamethylene glycol bis(2-ethylhexyl carbonate) by the following analysis:

|  | Found | Calculated |
| --- | --- | --- |
| C, percent | 65.8 | 66.4 |
| H, percent | 10.5 | 10.6 |
| Molecular Wt | 390 | 416 |

EXAMPLE VI

*Preparation of 1,5-pentamethylene glycol bis(allyl carbonate)*

1524 grams (12.65 moles) of allyl chloroformate was added to a mixture of 598 grams (5.75 moles) of pentamethylene glycol and 1090 grams (13.8 moles) of pyridine at such a rate that the reaction temperature was maintained below 50° F. After stirring overnight the reaction product was washed with water, 10% hydrochloric acid and saturated salt solution, and was dried over Drierite. The dried product was distilled at 1 mm. to give 1115 grams of a water-white liquid boiling at 143–151° C. at 1 mm., which represents a yield of 71.3%. The reaction product, which had $n_D^{20}$ 1.4495, was identified as 1,5-pentamethylene glycol bis(allyl carbonate) by the following quantitative analysis:

|  | Found | Calculated |
|---|---|---|
| C, percent | 57.5 | 57.4 |
| H, percent | 7.6 | 7.36 |

In addition to the plasticizer use previously mentioned, the polymethylene glycol carbonates of this invention are useful as paint thinners and as hydraulic fluids. The unsaturated derivatives, for example, pentamethylene glycol bis(2-allyl carbonate), also find application in the formation of resins, particularly those of the translucent type.

Obviously many modifications and variations of the invention, as hereinbefore set forth, may be made without departing from the spirit and scope thereof, and therefore only such limitations should be imposed as are indicated in the appended claims.

We claim:
1. Pentamethylene glycol bis(glycol ether carbonates) of the general formula

$$R'O(CH_2CH_2O)_nOCOC_5H_{10}OCO(OCH_2CH_2)_nOR'$$

wherein R' is an aliphatic hydrocarbon radical containing 1 to 12 carbon atoms and $n$ has a value of 1 to 10.

2. 1,5-pentamethylene glycol bis(2-ethoxyethyl carbonate).

3. 1,5-pentamethylene glycol bis(2,2',2''-triethoxyethyl carbonate).

4. 1,5-pentamethylene glycol bis(2-butoxyethyl carbonate).

References Cited in the file of this patent

UNITED STATES PATENTS

| 2,370,571 | Muskat et al. | Feb. 27, 1945 |
| 2,379,249 | Muskat et al. | June 26, 1945 |
| 2,379,250 | Muskat et al. | June 26, 1945 |
| 2,379,252 | Muskat et al. | June 26, 1945 |